United States Patent
Sugiyama

(10) Patent No.: US 7,602,082 B2
(45) Date of Patent: Oct. 13, 2009

(54) BACKUP TIME ENDORSED POWER SUPPLY APPARATUS

(75) Inventor: Minoru Sugiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 426 days.

(21) Appl. No.: 11/202,117

(22) Filed: Jul. 23, 2004

(65) Prior Publication Data

US 2006/0006740 A1    Jan. 12, 2006

(30) Foreign Application Priority Data

Jul. 23, 2003    (JP) ............................. 2003-200571

(51) Int. Cl.
*H02J 7/00*    (2006.01)
*H02J 9/00*    (2006.01)
(52) U.S. Cl. ....................................................... 307/66
(58) Field of Classification Search .................... 307/66
See application file for complete search history.

(56) References Cited

U.S. PATENT DOCUMENTS 7,109,606 B2 *   9/2006   Bedouet ....................... 307/81
7,157,808 B2 *   1/2007   Seligman ...................... 307/48
2004/0104715 A1   6/2004   Manabe et al.

FOREIGN PATENT DOCUMENTS

| EP | 0 580 180 A1 | 1/1994 |
|---|---|---|
| EP | 0 923 184 A2 | 6/1999 |
| JP | 10-145527 | 5/1998 |

* cited by examiner

*Primary Examiner*—Fritz M Fleming
*Assistant Examiner*—Dru M Parries
(74) *Attorney, Agent, or Firm*—Dickstein Shapiro LLP

(57) ABSTRACT

In order for a backup battery to prolong a backup time period for a mobile instrument, a control signal Sc1 becomes either low or high in accordance with a determination that a power supply voltage Vm of a main battery is either lower or higher than a prescribed level V1 requiring backup from the backup battery. A control signal Sc2 also becomes either low or high in accordance with a determination that a backup voltage Vb of the backup battery is either higher or lower than a power supply voltage Vm supplied by a main battery. When both of the control signals Sc1 and Sc2 are in the high level, a control switch is turned ON so as to stop a current from flowing from the backup battery to the main battery. The control switch is otherwise turned OFF.

14 Claims, 4 Drawing Sheets

| Vm | Sc1 | Vb | Sc2 | CONTROL SWITCH 5 OPERATION |
|---|---|---|---|---|
| 2.8V | L | 2.7V | H | OFF |
| 2.8V | L | 2.8V | L | OFF |
| 2.8V | L | 2.9V | L | OFF |
| 2.9V | H | 2.8V | H | ON |
| 2.9V | H | 2.9V | L | OFF |
| 2.9V | H | 3.0V | L | OFF |

BACKUP TIME ENDORSED POWER SUPPLY APPARATUS

CROSS-REFERENCE TO RELATED APPLICATIONS

This application claims priority under 35 USC §119 to Japanese Patent Application No. 2003-200571 filed on Jul. 23, 2003, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention refers to a power supply apparatus for use in a mobile instrument such as a mobile phone driven by a secondary (rechargeable) battery, and in particular, to a power supply apparatus employing a backup battery capable of supplying power in place of a main battery when the main battery voltage decreases to a prescribed level.

2. Discussion of the Background

In a mobile instrument such as a mobile phone employing a secondary battery as a power supply, it is now possible, by separately providing a backup battery, to maintain the mobile instrument in a prescribed operable condition even when a voltage of the secondary battery (as a main battery) is lower than a prescribed level. In order to prolong a life of such a backup battery, a power supply circuit is generally utilized to prevent consumption of power and reducing a backup time period capacity by prohibiting needless backup battery usage as discussed in Japanese Patent Application Laid Open No. 10-145527 and as illustrated in FIG. 7.

Specifically, a diode 105 is connected between first and second power supply terminals 102 and 104. The first power supply terminal 102 connects to a main battery 101 formed from a secondary battery that supplies the mobile instrument with power. The second power supply terminal 104 connects to a backup battery 103 that supplies power and maintains the mobile instrument in a prescribed operative condition when the main battery 101 voltage Vm decreases to a prescribed level. The diode 105 prolongs a life of the backup battery 103 by preventing current from flowing from the backup battery 103 to the main battery 101.

A control switch 106 is connected in parallel across the diode 105. A voltage monitor circuit 107 monitors the voltage of the main battery 101 and controls the control switch 106 to operate in accordance with the voltage Vm. For example, when the voltage Vm of the main battery 101 ranges from 3.2V to 4.2V as a normal condition, and that of the backup battery 103 is 3.0V, the voltage monitoring circuit 107 turns OFF the control switch 106. When the control switch 106 is turned OFF, the diode 105 is connected between the first and second power supply terminals 102 and 104, and thereby current is prevented from flowing from the backup battery 103 to the main battery 101. As a result, the life of the backup battery 103 is prolonged.

Further, in order to prolong a backup time period (capacity) for a mobile instrument, a voltage of a backup battery recently has been increased. For example, the backup battery 103 having a voltage of from 3.0V to 3.3V is utilized to prolong the backup time period for the mobile instrument.

In such circumstances, however, when the control switch 106 is turned ON and if the voltage Vm of the main battery 101 becomes lower than that of the backup battery 103, some current flows from the backup battery 103 to the main battery 101, whereby the effective life of the backup battery 103 is shortened.

BRIEF SUMMARY OF THE INVENTION

Accordingly, an object of the present invention is to address and resolve such and other problems and provide a new and novel power supply apparatus. Such a new and novel power supply apparatus employs a backup battery that supplies a load with a voltage in place of a main battery when a voltage of the main battery decreases to a prescribed level. In the preferred embodiment, a diode, supplied with the main battery and the backup battery voltages through an anode and a cathode, respectively, outputs the voltage of the main battery to the load. A switch circuit is provided to short the diode. A voltage monitor circuit is provided to monitor and determine if the main battery voltage decreases to a prescribed level. A voltage comparison circuit is provided to compare the main battery voltage with the backup battery voltage. In the preferred embodiment, the switch circuit controls the diode to input the main battery voltage while preventing a current from flowing from the backup battery to the main battery when the main battery voltage is equal to or higher than the prescribed level and equal to or lower than the backup battery voltage.

In another embodiment, the switch circuit shorts the diode when the main battery voltage is input to the load. In yet another embodiment, the voltage comparison circuit is provided in the load. In yet another embodiment, the voltage monitor circuit is provided in the load. In yet another embodiment, the regulator circuit, the diode, the switch circuit, the voltage monitor circuit, and the voltage comparison circuit are integrated on an IC. In yet another embodiment, the regulator circuit, the diode, the switch circuit, and the voltage monitor circuit are integrated on an IC. In yet another embodiment, the regulator circuit, the diode, and the switch circuit are integrated on an IC.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE INVENTION

Figures 1, 2:
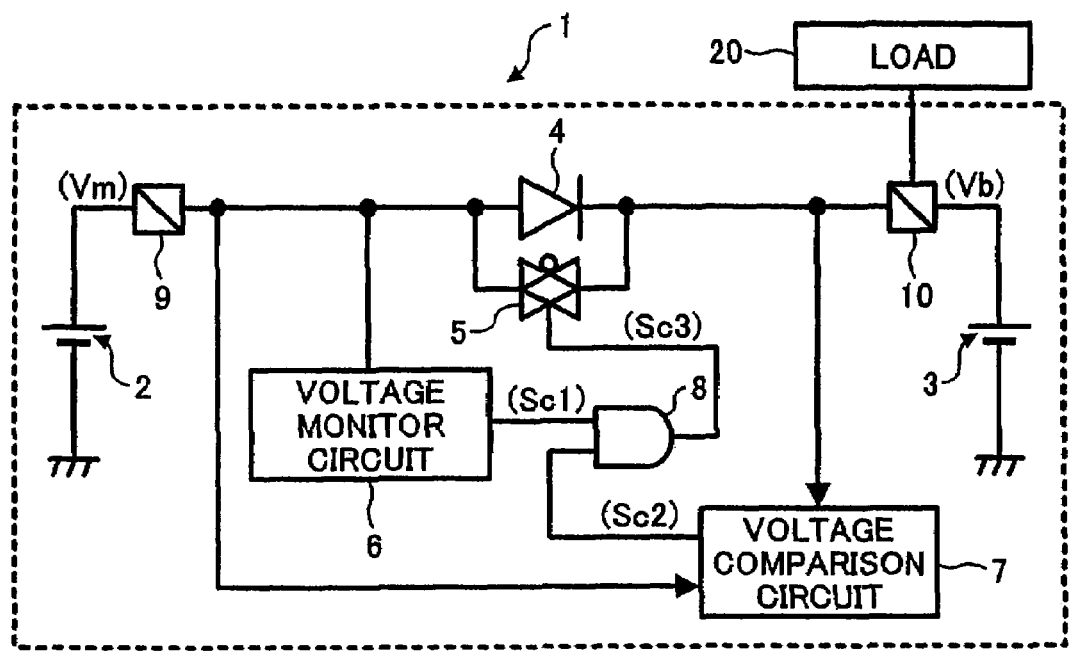
FIG. 1 illustrates an exemplary configuration of a power supply apparatus according to the first embodiment of the present invention.
FIG. 2 illustrates an exemplary table showing a relation between a power supply voltage Vm, a backup voltage Vd, respective control signals Sc1 and Sc2, and an operational condition of a control switch 5.

Referring now to the drawings, wherein like reference numerals designate identical or corresponding parts throughout several views, and in particular to FIG. 1, an exemplary configuration of a power supply apparatus according to the first embodiment is illustrated. As there shown, the power supply apparatus 1 includes a main battery 2 that supplies a load 20 having a prescribed function with power, a backup battery 3 that supplies power and maintains the load 20, in a prescribed operative condition to back up the main battery 2 when the voltage of the main battery 2 decreases to a prescribed level, and a diode 4 that cuts off a current flowing from the backup battery 3 to the main battery 2.

Also included are a control switch 5 connected to the diode in parallel, a voltage monitoring circuit 6 that outputs a signal indicating if a voltage Vm (hereinafter referred to as a power supply voltage) of the main battery 2 is higher than a prescribed voltage V1, a voltage comparison circuit 7 that outputs a signal indicating a comparison result of the power supply voltage Vm with the voltage of the backup battery 3 (hereinafter referred to as a backup voltage), and an AND circuit 8 that receives as inputs, at its corresponding input side terminals, respective outputs from the voltage monitoring circuit 6 and the voltage comparison circuit 7. The control switch 5 and the AND circuit 8 collectively form a switching circuit section. The main battery 2 is connected to a first power supply terminal 9. The backup battery 3 is connected to a second power supply terminal 10. The AND circuit 8 controls the control switch 5 to operate in accordance with the signals input from the voltage monitoring circuit 6 and the voltage comparison circuit 7.

An anode side of the diode 4 is connected to the first power supply terminal 9. A cathode side of the diode 4 is connected to the second power supply terminal 10. The control switch 5 is connected between the first and second power supply terminals 9 and 10, i.e., in parallel to the diode 4, thereby the load 20 receives power from the second power supply terminal 10. The voltage monitoring circuit 6 monitors the power supply voltage Vm and outputs a control signal Sc1 to the corresponding input terminal of the AND circuit 8 in accordance with the monitoring result. The voltage comparison circuit 7 compares the power supply voltage Vm with the backup voltage Vb and outputs a control signal Sc2 indicating a comparison result to the corresponding input terminal of the AND circuit 8. The AND circuit 8 outputs a control signal Sc3 in accordance with a combination of the respective input control signals Sc1 and Sc2, and controls the control switch 5 to operate.

The voltage monitoring circuit 6 outputs a low level control signal Sc1 when the power supply voltage Vm becomes lower than the prescribed voltage V1. The voltage monitoring circuit 6 outputs a high level control signal Sc1 when the power supply voltage Vm becomes equal to or higher than the prescribed voltage V1. The voltage comparison circuit 7 outputs a low level control signal Sc2 when the backup voltage Vb becomes equal to or higher than the power supply voltage Vm. The voltage comparison circuit 7 outputs a high level control signal Sc2 when the backup voltage Vb becomes lower than the power supply voltage Vm. For example, when the power supply voltage Vm decreases from 4.2V to 3.2V in a normal condition, and the backup voltage Vb is 3.3V, and the voltage V1 is set to 2.9V, an operational relation between the power supply voltage Vm, the backup voltage Vb, the respective control signals Sc1 and Sc2, and a condition of the control switch 5 as illustrated in FIG. 2.

When both of the control signals Sc1 and Sc2 are high, the control signal Sc3 is high. Accordingly, the control switch 5 is turned ON to obtain a conductive condition. Specifically, as understood from FIG. 2, when the power supply voltage Vm is equal to or higher than 2.9V, and the backup voltage Vb is lower than the power supply voltage Vm, the control switch 5 is turned ON and is in a conductive condition. Thus, the first power supply terminal 9 is connected to the second power supply terminal 10 by the control switch 5 while shorting the diode 4.

When the power supply voltage Vm is less than 2.9V, and/or the backup voltage Vb is equal to or more than the power supply voltage Vm, the control switch 5 is turned OFF to obtain a cutoff condition, and the first power supply terminal 9 is connected to the second power supply terminal 10 via the diode 4. Thus, even if a battery precharged at 3.0V or 3.3V is utilized as a backup battery 3 and the main battery 2 power decreases, a current is prevented from flowing from the backup battery 3 to the main battery 2. As a result, a backup time period available for a mobile instrument can be prolonged.

Figure 3:
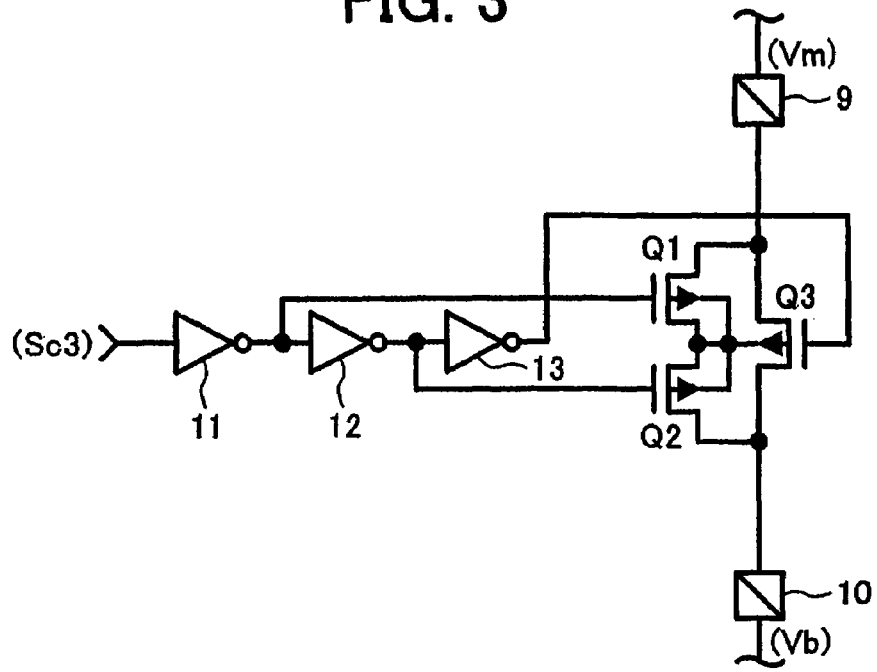
FIG. 3 illustrates an exemplary circuit forming a diode 4 and a control switch 5 illustrated in FIG. 1.

An exemplary circuit including a diode 4 and a control switch 5 is illustrated in FIG. 3. As shown, the diode 4 and control switch 5 are formed from a plurality of inverters 11 to 13, and a plurality of PMOS transistors Q1 to Q3. Between first and second power supply terminals 9 and 10, the PMOS transistors Q1 and Q2 are serially connected, and the PMOS transistor Q3 is connected to such a serial circuit in parallel. Respective substrate gates (or back gates) of the PMOS transistors Q1 to Q3 are connected to each other, and such a connection point is further connected to a connection point formed between the PMOS transistors. Q1 and Q2.

The inverters 11 to 13 are serially connected between an output terminal of the AND circuit 8 and a gate of the PMOS transistor Q3. A connection point between the inverters 11 and 12 is connected to the gate of the PMOS transistor Q1. A connection point between the inverters 12 and 13 is connected to the gate of the PMOS transistor Q2. The AND circuit 8 outputs a high level control signal Sc3 only when both of the control signals Sc1 and Sc2 are high, and a low level control signal Sc3 in other situations, respectively.

When a low level control signal Sc3 is transmitted from the AND circuit 8, both of the PMOS transistors Q1 and Q3 are turned OFF, and the PMOS transistor Q2 is turned ON. In such a situation, a parasitic diode is formed between the source and the substrate gate of the PMOS transistor Q1. Due to the activated condition (i.e., turned ON) of the PMOS transistor Q2, the diode is connected between the first and second power supply terminals 9 and 10, thereby the control switch 5 of FIG. 1 is turned OFF and is in a cutoff condition.

When a high level control signal Sc3 is transmitted from the AND circuit 8, the PMOS transistors Q1 and Q3 are turned ON, and the PMOS transistor Q2 is turned OFF, respectively. In this situation, the first power supply terminal 9 is connected to the second power supply terminal 10 by the PMOS transistor Q3, and the control switch 5 of FIG. 1 is turned ON and is in a conductive condition. Specifically, when the power supply voltage Vm is equal to or higher than 2.9V, and the backup voltage Vb is lower than the power supply voltage Vm, the PMOS transistors Q1 and Q3 are turned ON, and the PMOS transistor Q2 is turned OFF, respectively. In contrast, when the power supply voltage Vm is less than 2.9V, and the backup voltage Vb is equal to or higher than the power supply voltage Vm, the PMOS transistors Q1 and Q3 are turned OFF, and PMOS transistor Q2 is turned ON, respectively.

Figure 4:
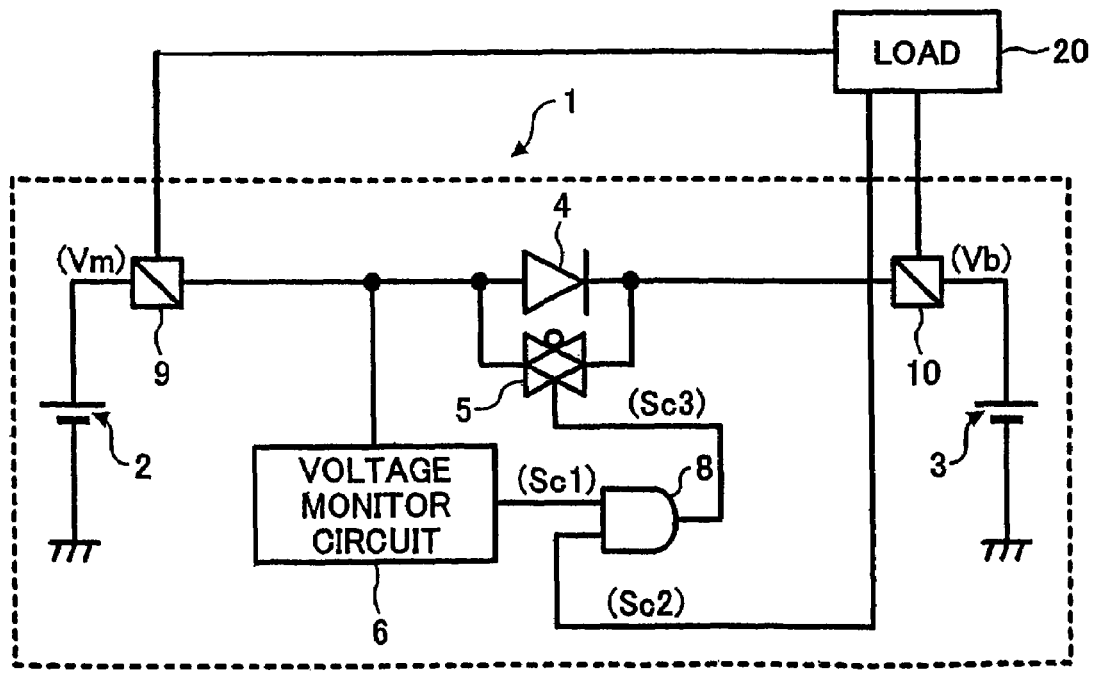
FIG. 4 illustrates another exemplary configuration of a power supply apparatus according to a preferred embodiment of the present invention.

In a mobile phone and similar devices, a load 20 at least includes a CPU to monitor a voltage of the first power supply terminal 9 (i.e., the power supply voltage Vm) and a display apparatus or the like to display a consumption condition of the main battery 2 based upon the monitored power supply voltage Vm. The CPU serves as the voltage comparison circuit 7 of FIG. 1. An exemplary power supply apparatus is illustrated in FIG. 4, wherein the function of the voltage comparison circuit 7 of FIG. 1 is performed by the CPU (not shown) of the load 20. In FIG. 4, the same reference numbers are assigned to the same or similar devices as those illustrated in FIG. 1 and thus their descriptions are omitted.

As shown, the load 20 receives and compares the power supply voltage Vm and the backup voltage Vb output from the first and second power supply terminals 9 and 10, respectively. The load 20 then outputs a control signal Sc2 to the corresponding input terminal of the AND circuit 8 in accordance with the comparison result. The operation is the same as that of the voltage comparison circuit 7 discussed above, so explanations of the voltage comparison and subsequent generation of the control signal Sc2 are omitted.

Figure 5:
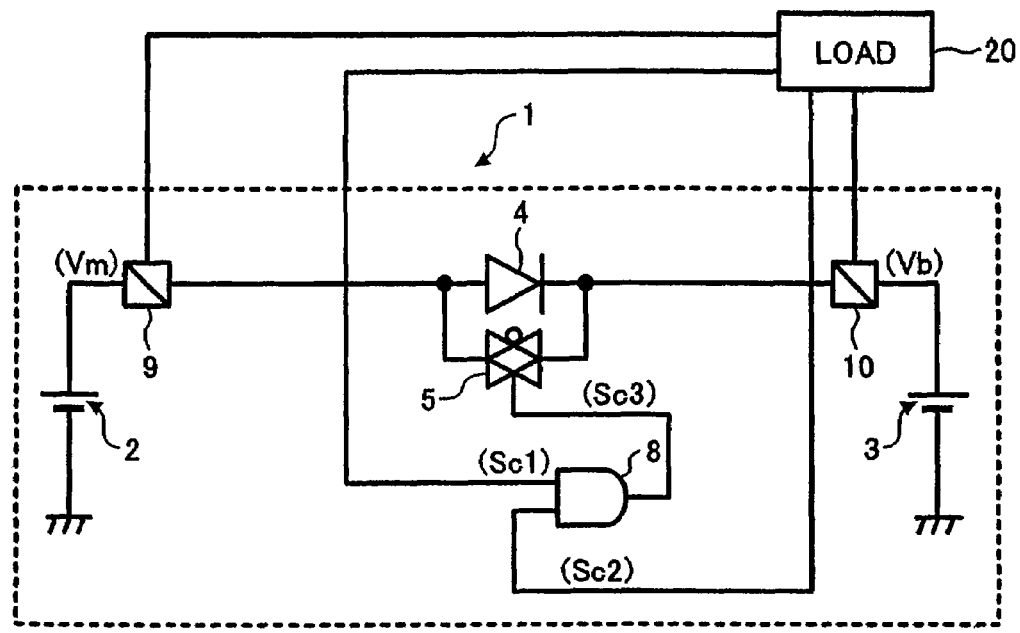
FIG. 5 illustrates yet another exemplary configuration of a power supply apparatus according to a preferred embodiment of the present invention.

Further, the CPU of the load 20 can also perform a similar function to the voltage monitoring circuit 6 of the power supply apparatus as illustrated in FIG. 5. Specifically, the load 20 receives inputs of the power supply voltage Vm and backup voltage Vb from the first and second power supply terminals 9 and 10, respectively. The same or similar functions are described above in connection with FIG. 1 and are not explained again here The load 20 then generates and outputs a control signal Sc1 to the corresponding input terminal of the AND circuit 8 in accordance with a determination that the power supply voltage Vm is lower than a prescribed level V1. The load 20 compares the power supply voltage Vm with the backup voltage Vb, and generates and outputs the control signal Sc2 in accordance with the comparison result to the corresponding input terminal of the AND circuit 8. Because of the similarity to those in the voltage monitor circuit 6 and voltage comparison circuit 7, operations of the load 20 for generating these control signals Sc1 and Sc2 are not described. With reference to FIGS. 4 and 5, the load 20 has substantially the same configuration as the power supply apparatus 1.

Figure 6:
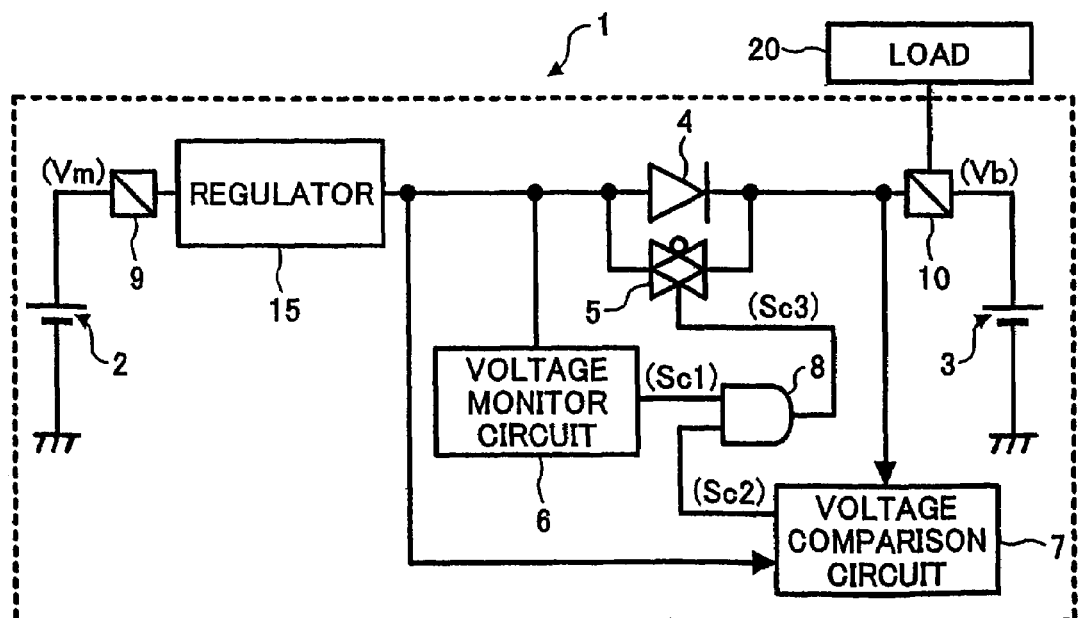
FIG. 6 illustrates yet another exemplary configuration of a power supply apparatus according to a preferred embodiment of the present invention.
Figure 7:
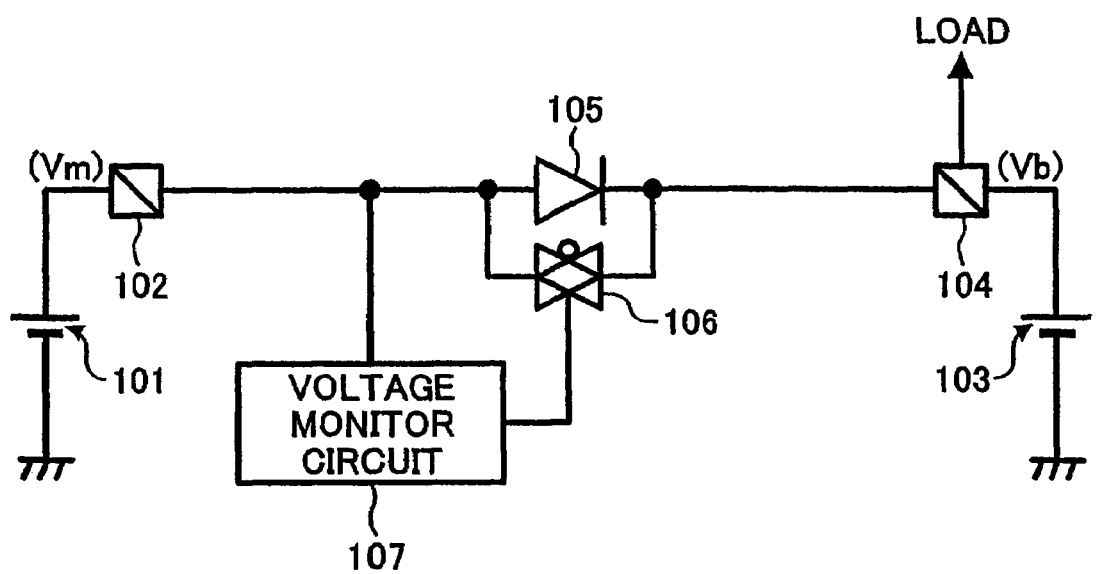
FIG. 7 illustrates a conventional power supply apparatus employing a backup battery.

Further, as illustrated in FIG. 6, a regulator 15 can be arranged between the first power supply terminal 9 and the anode of the diode 4. Thus, the first power supply terminal 9 is connected to the anode of the diode 4 via the regulator 15. The voltage monitoring circuit 6 can monitor an output voltage of the regulator 15 rather than the power supply voltage Vm. The control switch 5, the voltage monitoring circuit 6, the voltage comparison circuit 7, the AND circuit 8, and the regulator 15 can be integrated on an IC.

Further, the regulator 15 can be arranged in the circuits of FIGS. 4 and 5 in a similar manner as in FIG. 6. When the regulator 15 is arranged in FIG. 4, the diode 4, the control switch 5, the voltage monitoring circuit 6, the AND circuit 8, and the regulator 15 can be integrated on an IC. When the regulator 15 is arranged in FIG. 5, the diode 4, the control switch 5, the AND circuit 8, and the regulator 15 can be integrated on an IC.

In such ways, according to the above-mentioned preferred embodiments of the power supply apparatus, the control signal Sc1 obtains low and high levels responsive to the voltage monitoring circuit 6 when the power supply voltage Vm becomes lower and equal to or higher than the prescribed voltage V1, respectively. Further, the control signal Sc2 obtains the low and high levels responsive to the voltage comparison circuit 7 when the backup voltage Vb becomes equal to or higher and lower than the power supply voltage Vm, respectively. When both of the control signals Sc1 and Sc2 are high, the control switch 5 is turned ON and is in a conductive condition. The control switch is otherwise turned OFF and is in a cutoff condition. Thus, even if a battery precharged at 3.0V or 3.3V is utilized as a backup battery 3 and the main battery 2 voltage decreases, current is prevented from flowing from the backup battery 3 to the main battery 2, and thereby a backup time period available for the mobile instrument can be prolonged.

Numerous additional modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States is:

1. A power supply apparatus employing a backup battery configured to supply a load with a voltage in place of a main battery when a voltage of the main battery decreases to a prescribed level, said power supply apparatus comprising:
    a first terminal connected to the main battery;
    a second terminal connected to the backup battery;
    a diode having an anode connected to the first terminal and a cathode connected to the second terminal, wherein the diode is configured to output the voltage of the main battery to the load through the second terminal;
    a switch circuit configured to short the diode;
    a voltage monitor circuit configured to monitor and determine if the main battery voltage decreases to a prescribed level;
    a voltage comparison circuit configured to compare the main battery voltage with the backup battery voltage; and
    a circuit responsive to the voltage monitor circuit and the voltage comparison circuit for controlling the switch circuit such that:
       the switch circuit shorts the diode when the main battery voltage is equal to or higher than the prescribed level and higher than the backup battery voltage to connect the first terminal to the second terminal; and
       the switch circuit does not short the diode when the main battery voltage is equal to or higher than the prescribed level and equal to or lower than the backup battery voltage to output the main-battery voltage to the load while preventing a current from flowing from the backup battery to the main battery.

2. The power supply apparatus according to claim 1, wherein the circuit responsive to the voltage monitor circuit and the voltage comparison circuit controls the switch circuit such that the switch circuit does not short the diode when the main battery voltage is lower than the prescribed level or lower than the backup battery voltage to prevent a current from flowing from the backup battery to the main battery.

3. The power supply apparatus according to any one of claims 1 and 2, wherein said voltage comparison circuit is provided in the load.

4. The power supply apparatus according to claim 3, wherein said voltage monitor circuit is provided in the load.

5. The power supply apparatus according to any one of claims 1 and 2, wherein said diode, the switch circuit, the voltage monitor circuit, and the voltage comparison circuit are integrated on an IC.

6. The power supply apparatus according any one of claims 1 and 2, wherein said diode, the switch circuit section, and the voltage monitor circuit section are integrated on an IC.

7. The power supply apparatus according to any one of claims 1 and 2, wherein said diode and the switch circuit are integrated on an IC.

8. A power supply apparatus employing a backup battery configured to supply a load with a voltage in place of a main battery when a voltage of the main battery decreases to a prescribed level, said power supply apparatus comprising:
   a first terminal connected to the main battery;
   a regulator circuit configured to regulate and output the main battery voltage from the first terminal;
   a second terminal connected to the backup battery;
   a diode having an anode connected to the regulator circuit and a cathode connected to the second terminal, wherein the diode is configured to output the output voltage of the regulator circuit to the load through the second terminal;
   a switch circuit configured to short the diode;
   a voltage monitor circuit configured to monitor and determine if the output voltage of the regulator circuit is lower than the prescribed level;
   a voltage comparison circuit configured to compare the output voltage with the backup battery voltage; and
   a circuit responsive to the voltage monitor circuit and the voltage comparison circuit for controlling the switch circuit such that:
      the switch circuit shorts the diode when the output voltage is equal to or higher than the prescribed level and higher than the backup battery voltage to connect the regulator circuit to the second terminal; and
      the switch circuit does not short the diode when the output voltage is equal to or higher than the prescribed level and equal to or lower than the backup battery voltage to output the main-battery voltage to the load while preventing a current from flowing from the backup battery to the main battery.

9. The power supply apparatus according to claim 8 wherein the circuit responsive to the voltage monitor circuit and the voltage comparison circuit controls the switch circuit such that the switch circuit does not short the diode when the output voltage is lower than the prescribed level or lower than the backup battery voltage to prevent a current from flowing from the backup battery to the main battery.

10. The power supply apparatus according to any one of claims 8 and 9, wherein said voltage comparison circuit is provided in the load.

11. The power supply apparatus according to claim 10, wherein said regulator voltage monitor circuit is provided in the load.

12. The power supply apparatus according to any one of claims 8 and 9, wherein said regulator circuit, the diode, the switch circuit, the voltage monitor circuit, and the voltage comparison circuit are integrated on an IC.

13. The power supply apparatus according to any one of claims 8 and 9, wherein said regulator circuit, the diode, the switch circuit, and the voltage monitor circuit are integrated on an IC.

14. The power supply apparatus according to any one of claims 8 and 9, wherein said regulator circuit, the diode, and the switch circuit are integrated on an IC.

* * * * *

UNITED STATES PATENT AND TRADEMARK OFFICE
CERTIFICATE OF CORRECTION

PATENT NO.        : 7,602,082 B2                                    Page 1 of 1
APPLICATION NO.  : 11/202117
DATED             : October 13, 2009
INVENTOR(S)       : Minoru Sugiyama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this

Fifth Day of October, 2010

David J. Kappos
*Director of the United States Patent and Trademark Office*